UNITED STATES PATENT OFFICE.

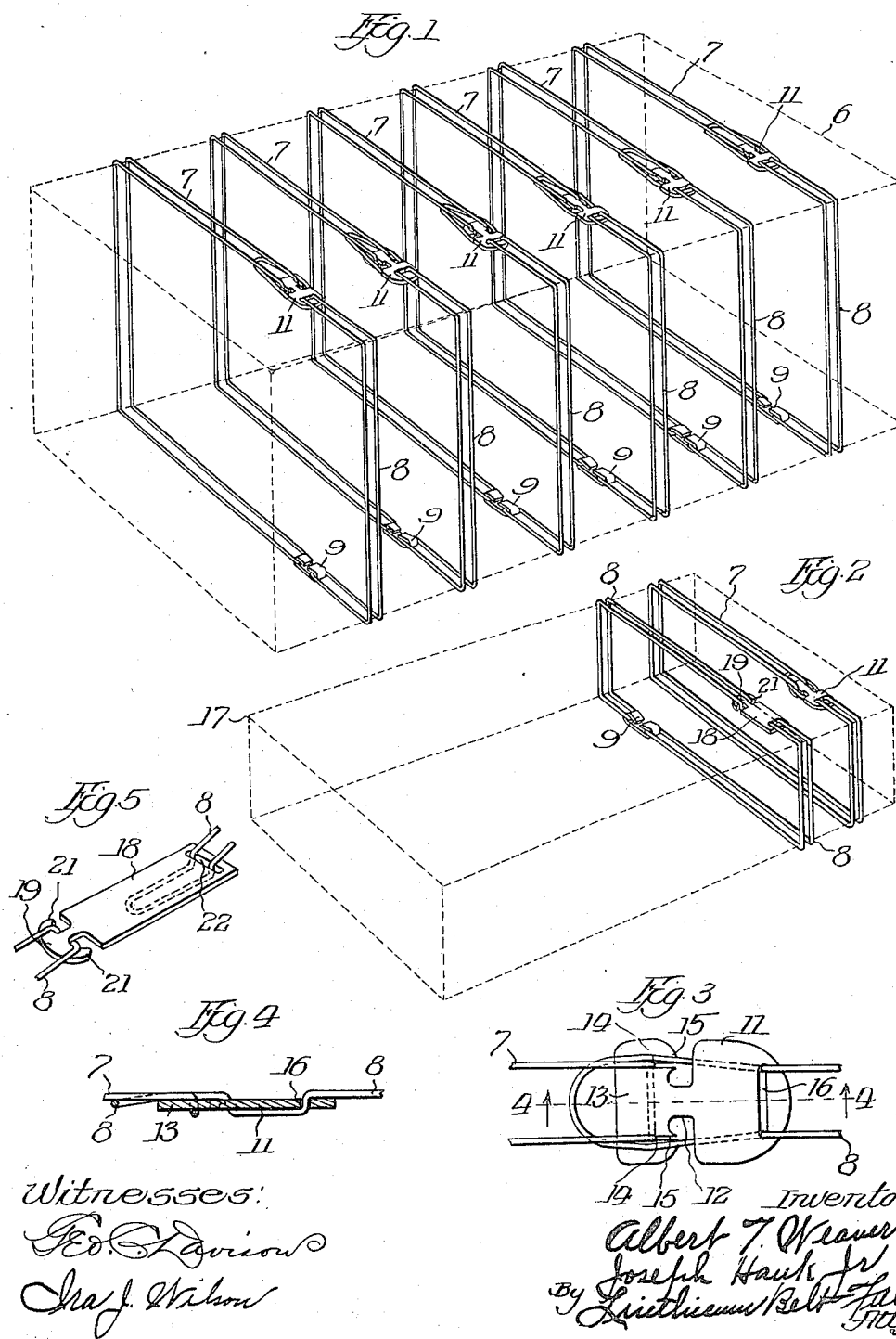

ALBERT T. WEAVER, OF JOLIET, AND JOSEPH HAUK, JR., OF WAUKEGAN, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

BALE-TIE.

1,165,730.

Specification of Letters Patent.

Patented Dec. 28, 1915.

Application filed July 11, 1913. Serial No. 778,516.

*To all whom it may concern:*

Be it known that we, ALBERT T. WEAVER and JOSEPH HAUK, Jr., citizens of the United States, residing at Joliet, in the county of Will, State of Illinois, and Waukegan, in the county of Lake, State of Illinois, respectively, have invented certain new and useful Improvements in Bale-Ties, of which the following is a specification.

The present invention relates in general to ties and has more particular reference to cotton bale ties, the primary purpose of the present invention being to provide a cotton bale tie which will be light in weight and at the same time strong and durable, and which can be readily applied both to a gin bale and to a compress bale and from which, when applied, there will be no sharp ends or corners projecting.

According to the present practice of handling cotton it is customary to bale the cotton as it comes from the gin into large bales weighing from five hundred pounds to seven hundred pounds and subsequently by hydraulic pressure to compress the gin bale to about one-third of its original size so that it will occupy a minimum amount of space during transportation.

In order to economize in bale tie material it is desirable, and in fact almost imperative, that the gin bale ties should be used again on the compress bales and one of the objects of the present invention is the provision of a bale tie which can be first used on a gin bale and then subsequently used on a compress bale without discarding or scrapping any of the original ties.

Since the cotton is subjected to several thousand pounds of pressure in reducing the gin bales to compress bale size, it is essential that the bale ties be very strong, and in order to economize in freight and cartage expenditures and also in the original cost of the bale ties, it is desirable that they be as light as is consistent with the strength required. It is also very important that when the ties are in position on the bales that no projecting ends or sharp corners be present which might result in injury to persons handling the bales or, which by rubbing together, might cause sparks which would ignite the cotton and result in disastrous conflagration in transit.

Our present invention is, therefore, designed, in view of the foregoing requirements, to provide a bale tie which will possess the required strength and at the same time be as light as is consistent with the strength required and which, when in position on the bale, will present no projecting ends, or sharp edges or corners.

To facilitate an understanding of our invention we have illustrated a preferred embodiment of the same in the accompanying drawings from which, when considered in connection with the following description, the invention should be readily understood.

Referring to the drawings: Figure 1 is a perspective view of a gin bale with several of our improved bale ties in position thereon; Fig. 2 is a similar view of a compress bale supplied with our improved bale ties; Fig. 3 is a plan view of our novel buckle; Fig. 4 is a longitudinal sectional view taken substantially on the line 4—4 of Fig. 3; and Fig. 5 is a perspective view of one form of buckle employed on the compress bale.

On the drawings, reference character 6 designates the gin bale which is shown in dotted lines in Fig. 1. The bale ties used on the gin bale each comprises, as shown, a long loop 7 of endless wire and a short loop 8 of endless wire connected together at one end by a connection or fastener 9, which in the form of the invention illustrated consists of a piece of metal having its ends bent toward each other to engage the ends of the wire loops. In practice the endless loops are preferably formed by welding together the ends of a length of wire. The longer loop 7 is preferably approximately twice the length of the loop 8 for a purpose which will be hereinafter apparent.

Each of the longer loops 7 is permanently attached, preferably at the factory, to a metal buckle designated generally by reference character 11. The buckle, as will be apparent from Fig. 3, is shaped to provide intermediate its ends a neck or narrow portion 12 terminating in a head 13 at one end of the buckle, which head is provided with a pair of openings 14 to receive the wire of the loop 7. The loop may be inserted through these openings before the ends are welded together, if desired, but we have found it convenient to slit the head 13 from the openings 14 toward the center of the buckle, as indicated by reference character 15, so that the wires may be introduced into the openings 14 through these slits after which the slits are closed sufficiently by hammering or by pressure to insure the retention of the loop in the openings. The opposite end of the buckle is provided with a transversely disposed slot 16 of sufficient size to permit the insertion of the free end of the wire loop therethrough. A transverse slot is employed, instead of separate openings, because the ends of the wire are connected and form a tongue which is to be thrust through the slot. The width of the slot is substantially the same as the thickness of the wire, and when the wire has been thrust through the slot from the outer side of the buckle and pushed forwardly underneath the latter and the pressure has been relieved from the bale, the wire will be sharply kinked or bent, as best shown in Fig. 4 of the drawings, whereby the wire will be held from pulling endwise out of the slot, and the engagement of the wires with the walls of the slot will tend to prevent the sidewise drawing together of said wires.

In use the buckle is placed upon the top of the bale around which the tie is passed. The free extremity of the tie is then inserted through the slot 16 from above and the tie is drawn as taut as necessary. The slot 16 is made only wide enough to accommodate the wire of the tie and when the pressure on the bale is released the tension exerted upon the tie longitudinally of the buckle will cause the wire to bend sharply at the edges of the slot, as shown in Fig. 4, so that the wire will be prevented from slipping in the slot. It will be manifest that the greater the tension exerted on the tie the more securely the tie will be held, thus insuring a secure fastening of the tie around the bale. The free end of the tie beneath the buckle may be left, if desired without further attention but in some instances it may be desirable to lift the sides of the loop up over the sides of the head 13, as shown in Figs. 3 and 4, thereby positively precluding disengagement of the end from the slot 16.

When the bales arrive at the compress machine they are first compressed sufficiently to permit removal of the ties. The loops 7 are then disconnected from the loops 8 at the fastener 9, the long loop 7 being of sufficient length for subsequent use on a compress bale 17, as shown at the right in Fig. 2. Two of the shorter loops 8 are then fastened together by one of the fasteners 9, thus providing another tie long enough for use on the compress bale. The longer loops 7 are already equipped with the buckles 11, as previously explained. It is necessary, however, to provide additional buckles for the ties produced by the two shorter loops. We prefer, therefore, to utilize for this purpose buckles 18, such as illustrated in Fig. 5, which are substantially similar to the buckles 11, except that the head 19, which corresponds to the head 13 of the buckles 11, is not provided with openings for the loops 8, the loops being secured thereto by slipping them over the wings 21 where they will be held in the position shown in Fig. 5 when tension is exerted upon the tie. The opposite end of the tie is passed downwardly through the slot 22 and is held in position against slippage by the edges of the slot in the same manner that the ends of the ties are retained in the slot 16. It will be manifest, therefore, that from two gin bale ties we are enabled to produce three compress bale ties with the aid of one additional buckle 18.

The ties constructed in accordance with our invention are strong and durable and at the same time of very light weight. They may be cheaply manufactured, compactly bundled for shipment and can be readily applied to the bales. The ties, when applied, bind the bales tightly without slippage and offer no objectionable projecting ends or sharp corners.

We believe that the invention will be fully understood from the foregoing without further description and it will be obvious that the structural details disclosed may be varied within considerable limits without departing from the scope of the invention as defined in the following claims.

We claim:

1. A bale tie, convertible for use on gin bales and on compressed bales, comprising a pair of metallic band members, one band member being substantially twice as long as the other and having one end detachably connected to an end of said other band member, and a buckle carried by the free terminal of one of the band members and adapted for detachable connection with the free terminal of the other band member, that end of the buckle-carrying band member which is remote from the buckle being capable of detachable engagement with the buckle when the band members have been disconnected.

2. A bale tie comprising two detachably connected non-elastic band members, one of the band members being substantially twice as long as the other, and means for detachably connecting the terminals of one band member to the respective terminals of the other band member, substantially as and for the purpose described.

3. The combination of a plurality of bale ties, each tie comprising two non-elastic band members, one of said band members being substantially twice as long as the other, means detachably connecting the said band members end for end, and a buckle carried by the free end of one of said band members and adapted to be engaged by the free end of the other of said band members, each composite tie being of a length to embrace a gin bale, each long band member being of a length to embrace a compressed bale, and two of the short band members being of a length to also embrace such a bale.

ALBERT T. WEAVER.
JOSEPH HAUK, Jr.

Witnesses:
JAMES E. SIME,
WM. W. WARD.

Copies of this patent may be obtained for five cents each, by addressing the "Commissioner of Patents, Washington, D. C."